United States Patent
Baba et al.

(10) Patent No.: US 7,821,398 B2
(45) Date of Patent: Oct. 26, 2010

(54) RFID TAG AND METHOD OF MANUFACTURING RFID TAG

(75) Inventors: Shunji Baba, Kawasaki (JP); Shigeru Hashimoto, Inagi (JP); Yoshiyasu Sugimura, Inagi (JP); Tsuyoshi Niwata, Inagi (JP); Satoru Nogami, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 329 days.

(21) Appl. No.: 12/127,937

(22) Filed: May 28, 2008

(65) Prior Publication Data

US 2008/0297351 A1    Dec. 4, 2008

(30) Foreign Application Priority Data

May 29, 2007    (JP) .............................. 2007-142221

(51) Int. Cl.
G08B 13/14    (2006.01)

(52) U.S. Cl. .............. 340/572.1; 340/572.8; 340/572.4; 156/60

(58) Field of Classification Search .............. 340/572.1, 340/572.8, 572.7, 572.2, 572.3, 572.4, 10.1; 156/277, 60; 342/51, 42, 44; 713/189, 150, 713/192, 193; 235/492; 283/109, 75
See application file for complete search history.

(56) References Cited

U.S. PATENT DOCUMENTS 6,019,865 A * 2/2000 Palmer et al. ............... 156/265
7,170,415 B2 * 1/2007 Forster ..................... 340/572.4
7,212,127 B2 * 5/2007 Jacober et al. ........... 340/572.8

FOREIGN PATENT DOCUMENTS

| JP | 2000-200332 A | 7/2000 |
|---|---|---|
| JP | 2000-311226 A | 11/2000 |
| JP | 2001-66990 A | 3/2001 |
| JP | 2001-351082 A | 12/2001 |
| JP | 2002-207984 A | 7/2002 |
| JP | 2005-128787 A | 5/2005 |

* cited by examiner

*Primary Examiner*—Anh V La
(74) *Attorney, Agent, or Firm*—Westerman, Hattori, Daniels & Adrian, LLP

(57) ABSTRACT

An RFID tag includes: a tag main body having a communication antenna, a circuit chip electrically connected to the antenna to perform wireless communication via the antenna, and a tabular sealing member in which the antenna and the circuit chip are enclosed; a print layer formed on a first surface of the tag main body by printing; and a protective film that covers the print layer. The print layer is formed only in a central area of the first surface surrounded by a marginal area of the first surface extending along the outer edge of the first surface. The protective film includes a covering portion that covers the print layer and an adhering portion that lies off the print layer while surrounding the outer edge of the print layer and adheres to the first surface.

6 Claims, 5 Drawing Sheets

RFID TAG AND METHOD OF MANUFACTURING RFID TAG

BACKGROUND OF THE INVENTION

1. Field of the Invention

The present invention relates to a radio frequency identification tag (RFID tag) that exchanges information with external devices in a non-contact manner, and to a method of manufacturing the RFID tag.

2. Description of the Related Art

Recently, there have been proposed various types of RFID tag that exchange information with external devices typified by reader-writers in a non-contact manner by radio wave (see for example, Japanese Patent Application Publication Nos. 2000-311226, 2000-200332, and 2001-351082). As one type of RFID tag, there is proposed a RFID tag having such a structure that an antenna pattern for wireless communications and a circuit chip are mounted on a base sheet made of plastics, paper or the like. It has been conceived to use this type of RFID tag in such a way that the RFID tag is affixed to an article or the like to exchange information about the article with an external device so that the article can be identified.

FIG. 1 shows a schematic sectional view of an internal component (inlay) that is an element of an example of a RFID tag.

An inlay 10 shown in FIG. 1 used for a RFID tag has such a structure that an antenna 12 formed by a conductor pattern is laid on a flexible sheet-like base 13 made of a PET film or the like and a circuit chip 13 is disposed on the antenna 12. In this circuit chip 13, a circuit for exchanging information with an external device via the antenna 12 is built in. The circuit chip 13 has connection terminals 13a formed on the underside of the circuit chip 13, which are soldered and electrically connected to the antenna 12. The circuit chip 13 is fixed on the base 11 by an adhesive 14 surrounding the circuit chip 13. The RFID tag has such a structure that the inlay 10 shown as an example in FIG. 1 is enclosed in the RFID tag.

FIGS. 2(A) and 2(B) are diagrams respectively showing a plan view and a sectional view of a RFID tag 20A.

FIG. 2(B) illustrates a section X-X of the RFID tag 20A shown in FIG. 2(A).

The RFID tag 20A has such a structure that the inlay 10 described above with reference to FIG. 1 is interposed between two sealants 21 and 22, and these sealants 21 and 22 are fused together by heat and pressure thereby enclosing the inlay 10. As a material of the sealants 21 and 22, for example, thermoplastic urethane, PET or the like can be used.

Incidentally, for the purpose of aiding the understanding of these sealants 21 and 22, a line is drawn between the two sealants 21 and 22 in FIG. 2(B) to show them as if they are separated. Actually however, the sealants 21 and 22 are fused with each other to be one piece.

Here, a tabular structure, which is formed by the inlay 10 enclosed by the two sealants 21 and 22, is referred to as a tag main body 200. On the entire top surface of the tag main body 200, a print layer 23 is formed by printing, and a protective film 24 for protecting the print layer 23 is disposed thereon.

Incidentally, Japanese Patent Application Publication No. 2001-351082 discloses a RFID tag having no protective film and thus a print surface is exposed, Japanese Patent Application Publication No. 2002-207984 discloses a structure in which an inlay for RFID tag is enclosed, and Japanese Patent Application Publication No. 2001-66990 discloses a structure in which an IC tag (inlay for RFID tag) is enclosed.

A RFID tag is provided with a print for the purpose of enhancing the design of the RFID tag, visually checking the information such as ID, and the like. If an RFID tag is provided with a print exposed at the surface of the RFID tag as disclosed in Japanese Patent Application Publication No. 2002-207984, a problem such as removal or bleaching of the print is very likely to occur when the RFID tag is used outdoors or undergoes environmental stresses such as cleaning.

Besides the printing, there is another technique known as laser marking that forms grooves in the surface of a RFID tag by means of laser to record information. However, the laser marking has such problems that what is formed by the laser marking is more difficult to see than that formed by the printing and the laser marking is incapable of providing color printing.

In order to solve these problems, it is conceivable to dispose the protective film 24 on the print layer 23 as described with reference to FIG. 2. However, water and the like are very likely to enter through the sides of the protective film 24 thereby peeling off the protective film 24.

Further, if the surface of the RFID tag after being molded is provided with a print and then coated with the protective film, it is expected that the number of manufacturing processes will increase, thereby increasing the cost.

SUMMARY OF THE INVENTION

The present invention has been made in view of the above circumstances and provides a RFID tag having a stable print, and a method of manufacturing the RFID tag provided with the stable print by a small number of processes.

An RFID tag according to the present invention includes:

a tag main body having a communication antenna, a circuit chip electrically connected to the antenna to perform wireless communication via the antenna, and a tabular sealing member in which the antenna and the circuit chip are enclosed;

a print layer formed on a first surface of the tag main body by printing; and a protective film that covers the print layer;

wherein the print layer is formed only in a central area of the first surface surrounded by a marginal area of the first surface extending along the outer edge of the first surface, and the protective film includes a covering portion that covers the print layer and an adhering portion that lies off the print layer while surrounding the outer edge of the print layer and adheres to the first surface.

In the RFID tag of the present invention, the protective film spreads beyond the print layer and has the adhering section that adheres to the first surface (a surface of the tag main body) while surrounding the outer edge of the print layer. Therefore, it is possible to prevent water and the like from entering the print layer. In addition, because the protective film is adhered to the tag main body, it is also possible to prevent the protective film itself from being peeled off, thereby preventing bleaching or removal of the print.

In the RFID tag according to the present invention, it is preferable that the protective film is made of the same material as that of the first surface of the tag main body.

The adherence can be expected to improve by using the same material.

In the RFID tag according to the present invention, it is preferable that the protective film includes a marked portion where a groove is formed by laser marking, and the print layer and the marked portion are formed in respective areas that do not overlap each other when the protective film is viewed in the thickness direction thereof.

Printing and laser marking may be both employed in the RFID tag of the present invention. However, if the laser marking is applied to an area where the print layer is present, grooves are formed by laser in that area and thus water and the like are very likely to enter the print layer through these grooves.

For this reason, when the printing and laser marking are both employed in the RFID tag of the present invention, they are applied to different areas that do not overlap each other, thereby stabilizing the print.

A method of manufacturing a RFID tag according to the present invention includes the steps of:

preparing: (a) an inlay having a base, a communication antenna arranged on the base, and a circuit chip connected to the antenna to perform wireless communication via the antenna, (b) a first sealing member disposed on a first face of the inlay, (c) a second sealing member disposed on a second face of the inlay, the second sealing member having a first surface which is opposite to a surface where the inlay is disposed and on which a print layer is formed by printing in only a central area of the first surface, the central area being surrounded by a marginal area of the first surface extending along the outer edge of the first surface, and (d) a protective member that covers the print layer and has an area spreading beyond the print layer;

stacking the first sealing member, the inlay, the second sealing member, and the protective member in this order; and heating and pressurizing the entire stack of the first sealing member, the inlay, the second sealing member, and the protective member, so that the inlay is enclosed by the first sealing member and the second sealing member and there is formed a protective film having a covering portion that covers the print layer and an adhering portion that lies off the print layer while surrounding the outer edge of the print layer and adheres to the first surface.

According to the method of manufacturing the RFID tag of the present invention, enclosing the inlay and coating the print layer can be both carried out at a time in the step of heating and pressurizing. Accordingly, it is possible to provide a RFID tag at a low cost by decreasing the number of manufacturing processes.

In the method according to the present invention, it is preferable that the first sealing member, the second sealing member, and the protective member are made of the same material.

If these elements are made of the same material, it is possible to improve the adherence, thereby further reliably enclosing the inlay and the print layer.

As described above, according to the present invention, it is possible to keep the print stable and manufacture the RFID tag in a small number of processes.

DETAILED DESCRIPTION OF THE INVENTION

Embodiments of the present invention will be described with reference to the drawings.

Figure 3A:
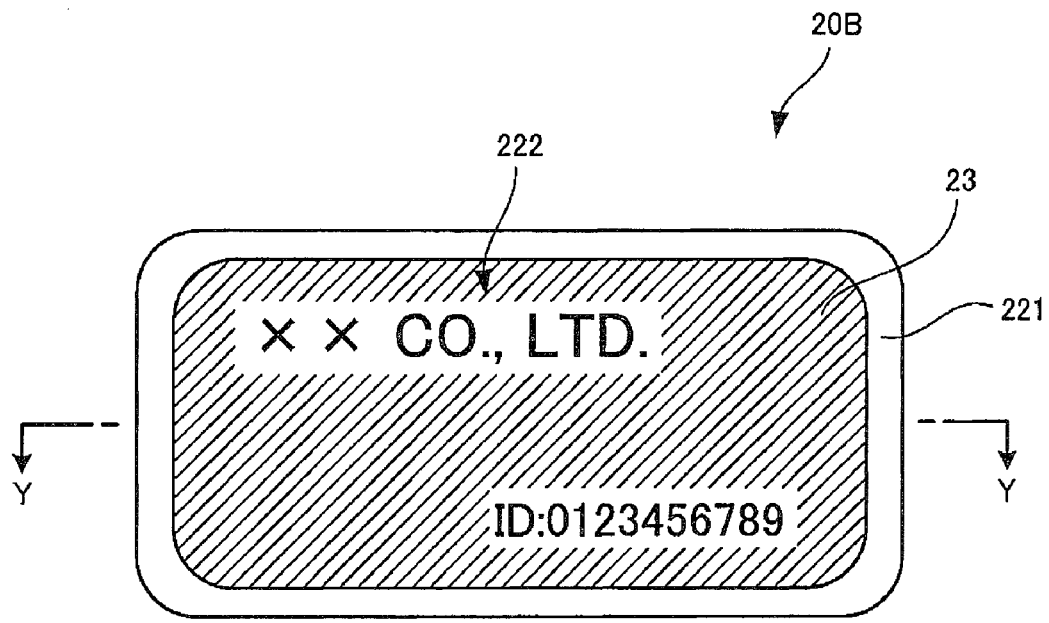
FIGS. 3(A) and 3(B) are diagrams respectively showing a plan view and a sectional view of a RFID tag according to an embodiment of the present invention.
Figure 3B:
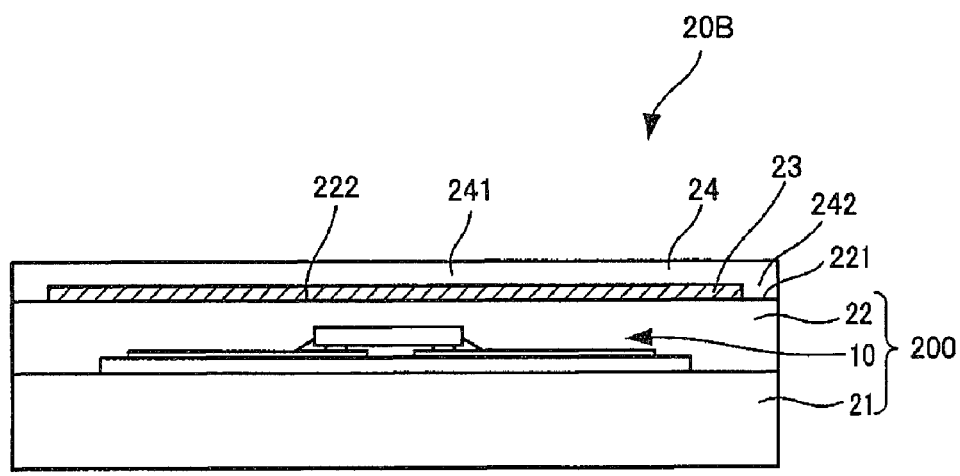

FIGS. 3(A) and 3(B) are diagrams respectively showing a plan view and a sectional view of a RFID tag 20B according to an embodiment of the present invention.

FIG. 3(B) illustrates a section Y-Y of the RFID tag 20B shown in FIG. 3(A).

Figure 2A:
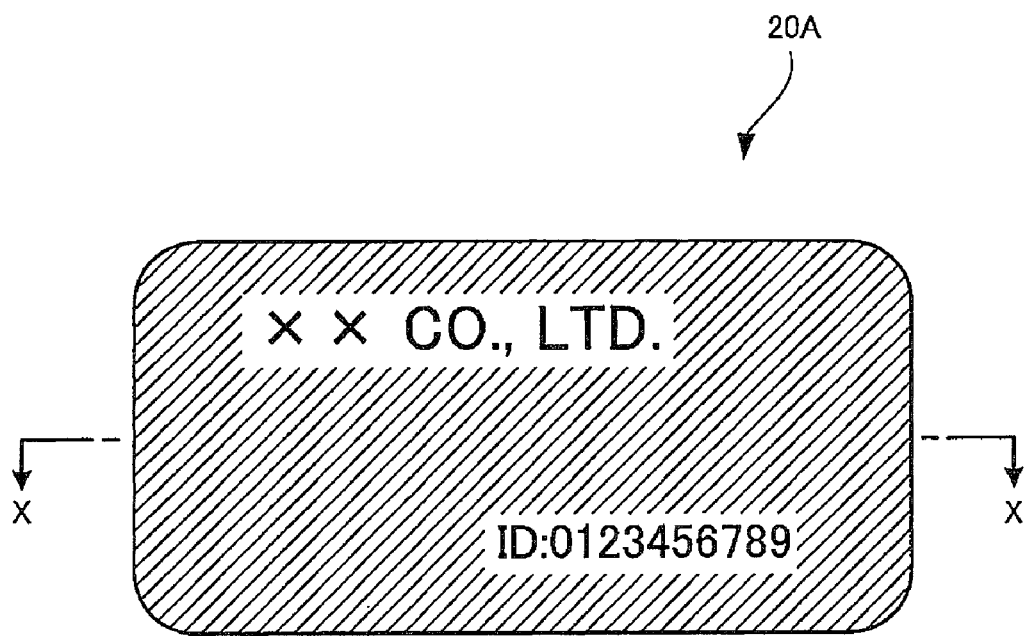
FIGS. 2(A) and 2(B) are diagrams respectively showing a plan view and a sectional view of a RFID tag.
Figure 2B:
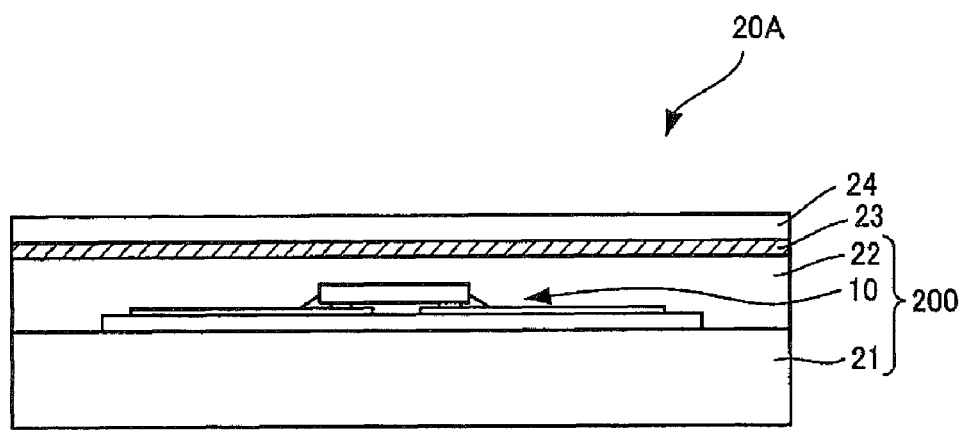

The elements of the RFID tag 20B similar to those of the RFID tag 20A shown in FIGS. 2(A) and 2(B) are assigned the same reference characters as those shown in FIGS. 2(A) and 2(B).

Figure 1:
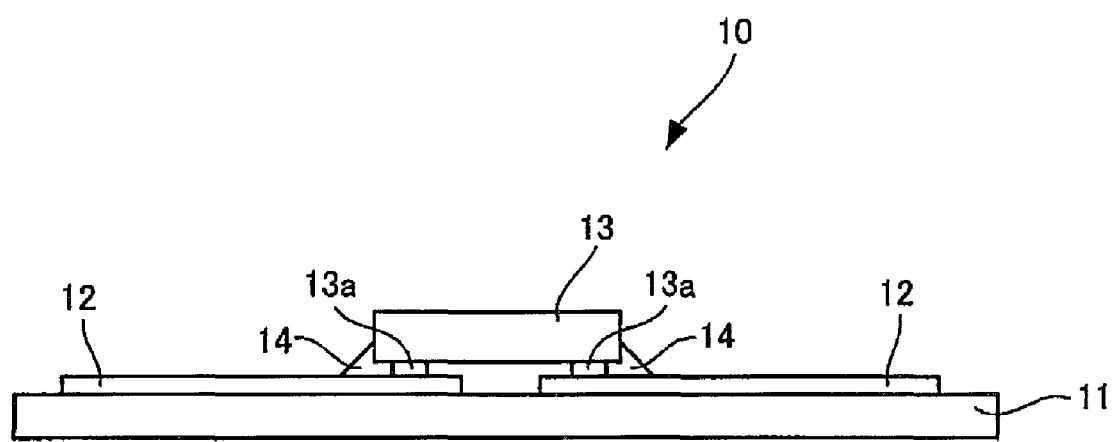
FIG. 1 is a schematic sectional view of an internal component (inlay) that is an element of an example of a RFID tag.

A tag main body 200 that is an element of the RFID tag 20B is tabular as a whole and has the same structure as that of the tag main body 200 of the RFID tag 20A shown in FIGS. 2(A) and 2(B). In other words, the tag main body 200 shown in FIG. 3(B) has such a structure that an inlay 10 similar to that described with reference to FIG. 1 is interposed between two sealants 21 and 22, and the sealants 21 and 22 are fused together by heat and pressure, thereby enclosing the inlay 10. As is the case with the RFID tag 20A shown FIGS. 2(A) and 2(B), thermoplastic urethan, PET or the like can be used as a material of these sealants 21 and 22. Furthermore, as is the case with the RFID tag 20A shown FIGS. 2(A) and 2(B), for the purpose of aiding the understanding of these sealants 21 and 22, a line is drawn between the two sealants 21 and 22 in FIG. 2(B) to show them as if they are separated. Actually however, the sealants 21 and 22 are made of the same material and fused together by heat and pressure to be one piece.

On the top surface of the sealant 22 (on the top surface of the tag main body 200), which is one of the two sealants 21 and 22, a print layer 23 is formed. The print layer 23 is different from that shown in FIGS. 2(A) and 2(B), and is formed only in a central area 222 surrounded by a marginal area 221 that extends along the outer edge of the top surface.

Further, a protective film 24 is formed on the print layer 23. The protective film 24 includes a covering portion 241 that covers the print layer 23, and an adhering portion 242 that lies off the print layer 23 while surrounding the outer edge of the print layer 23 and adheres to the top surface of the tag main body 200.

Incidentally, for the purpose of aiding the understanding of the elements, a line is drawn between the marginal area 221 of the tag main body 200 and the adhering portion 242 of the protective film 24 in FIG. 3(B) to show them as if they are separated. Actually however, the top surface of the tag main body 200 (i.e. sealant 22) and the protective film 24 are made of the same material, and the marginal area 221 of the tag main body 200 and the adhering portion 242 of the protective film 24 are fused with each other to be one piece.

Since the protective film 24 has the covering portion that covers the print layer 23 and the adhering portion 242 that fuses with the tag main body 200 by surrounding the outer edge of the print layer 23 in the RFID tag 20B shown in FIGS. 3(A) and 3(B) as described above, it is possible to prevent water and the like from entering the print layer 23 and the protective film 24 from being peeled off, so that the print layer 23 can be stably preserved for a long time.

Moreover, since the two sealants 21 and 22 and the protective film 24 are all made of the same material, they are reliably fused together by heat and thereby enclosing the inlay 10 and the print layer 23 with reliability.

Figure 4:
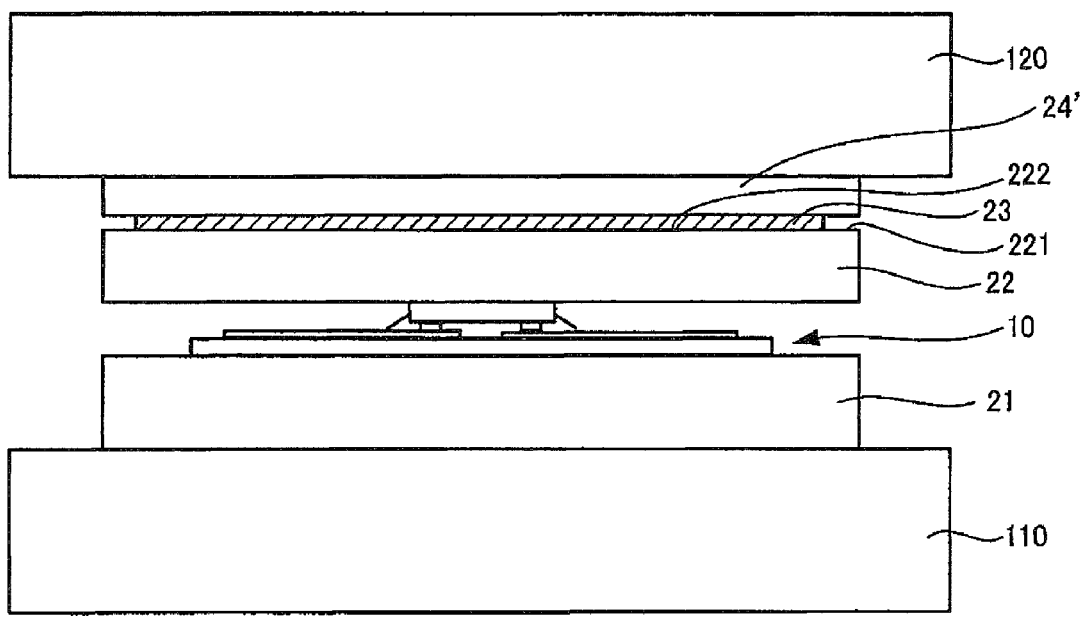
FIG. 4 is a diagram showing a method of manufacturing the RFID tag shown in FIG. 3(A) and FIG. 3(B)

FIG. 4 is a diagram showing a method of manufacturing the RFID tag shown in FIG. 3(A) and FIG. 3(B).

In this figure, the inlay 10 having the structure shown in FIG. 1, the sealant 21 to be disposed under the inlay 10, the sealant 22 to be disposed on the inlay 10, and a protective member 24' are prepared.

Here, on the sealant 22 to be disposed on the inlay 10, the print layer 23 is already formed in the central area 222 of the top surface of the sealant 22 excluding the marginal area 221.

Further, the protective member 24' has the area that covers and spreads beyond the print layer 23, i.e., the area is equal to those of the two sealants 21 and 22 in the example shown in FIG. 4.

The two sealants 21 and 22 and the protective member 24' are made of the same material such as thermoplastic urethan, PET, or the like.

As shown in this figure, the sealant 21, the inlay 10, the sealant 22, and the protective member 24' are stacked in this order on a heating and pressurizing stage 110. Subsequently, a heating and pressurizing head 120 is placed on the top of the stack of these elements, which are then heated and pressurized by the heating and pressurizing stage 110 and the heating and pressurizing head 120 while being held therebetween. As a result, there are formed: the tag main body 200 (see FIG. 3(B)) in which the inlay 10 is enclosed by the two sealants 21 and 22; and the protective film 24 having the covering portion 241 that covers the print layer 23 and the adhering portion 242 that surrounds the outer edge of the print layer 23 and adheres to the top surface of the sealant 22.

Here, as described above, enclosing the inlay 10 and enclosing the print layer 23 are carried out at a time in a heating and pressurizing process and therefore, it is possible to manufacture a RFID tag provided with a print by a small number of processes.

Figure 5A:
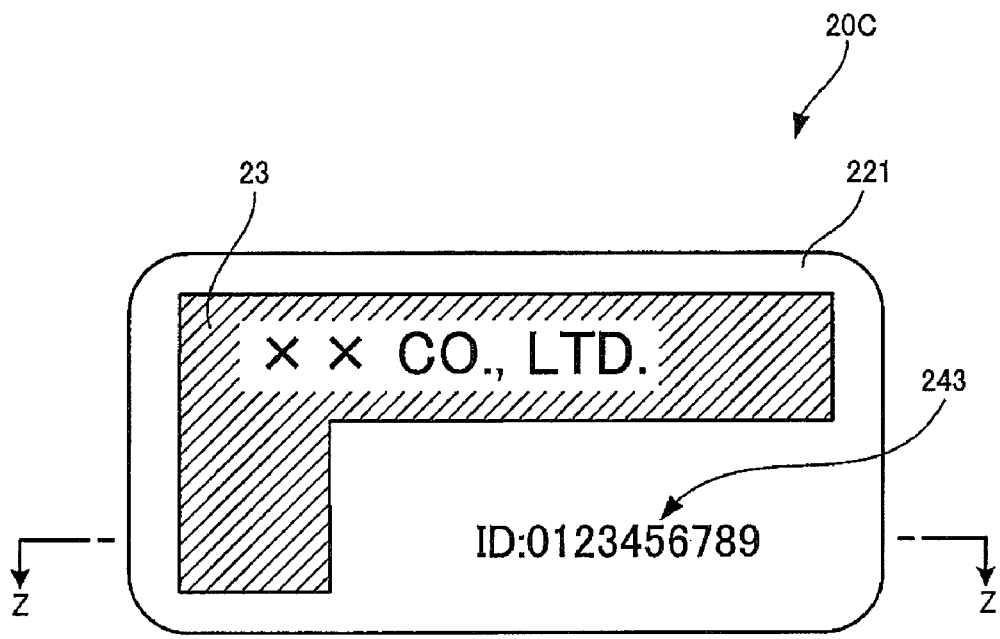
FIGS. 5(A) and 5(B) are diagrams respectively showing a plan view and a sectional view of a RFID tag according to another embodiment of the present invention.
Figure 5B:
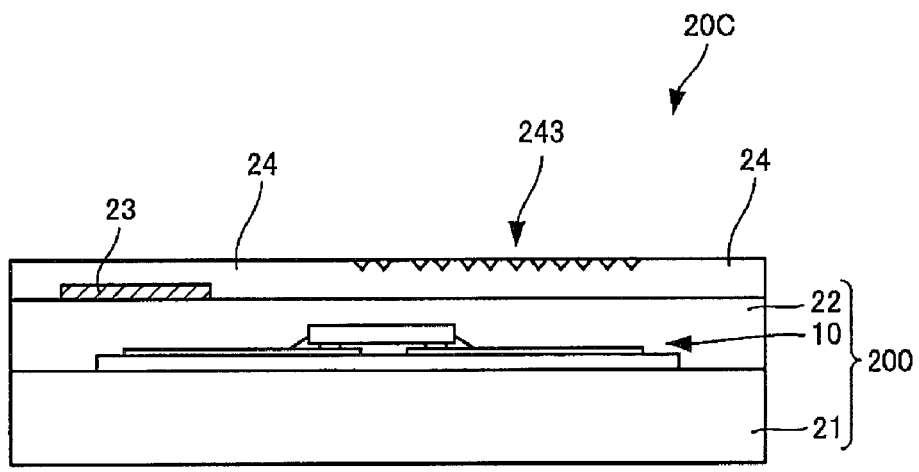

FIGS. 5(A) and 5(B) are diagrams respectively showing a plan view and a sectional view of a RFID tag 20C according to another embodiment of the present invention.

FIG. 5(B) illustrates a section Z-Z of the RFID tag 20C shown in FIG. 5(A).

A tag main body 200 of the RFID tag 20C has the same structure and shape as those of the RFID tag 20A shown in FIGS. 2(A) and 2(B) and the RFID tag 20B shown in FIGS. 3(A) and 3(B) and therefore, detailed description thereof will be omitted.

In the RFID tag 20C shown in FIGS. 5(A) and 5(B), a print layer 23 is formed only in a part of a central area surrounded by a marginal area 221 that extends along the outer edge of the top surface of the tag main body 200. On another portion of the central area, a laser-marked portion 243 is formed by laser marking.

In this way, in the case of the RFID tag 20C shown in FIGS. 5(A) and 5(B), both printing and laser marking are employed. When the protective film 24 is viewed in the thickness direction, i.e., in the plan view shown in FIG. 5(A), the print layer 23 and the laser-marked portion 243 are formed without overlapping each other. Therefore, even if grooves formed by the laser marking are somewhat deep, water and the like do not enter the print layer 23 through the grooves so that the print layer 23 can be stably preserved.

What is claimed is:

1. An RFID tag comprising:
    a tag main body having a communication antenna, a circuit chip electrically connected to the antenna to perform wireless communication via the antenna, and a tabular sealing member in which the antenna and the circuit chip are enclosed;
    a print layer formed on a first surface of the tag main body by printing; and
    a protective film that covers the print layer;
    wherein the print layer is formed only in a central area of the first surface surrounded by a marginal area of the first surface extending along the outer edge of the first surface, and
    the protective film includes a covering portion that covers the print layer and an adhering portion that lies off the print layer while surrounding the outer edge of the print layer and adheres to the first surface.

2. The RFID tag according to claim 1, wherein the protective film is made of the same material as that of the first surface of the tag main body.

3. The RFID tag according to claim 1, wherein the protective film includes a marked portion where a groove is formed by laser marking, and
    the print layer and the marked portion are formed in respective areas that do not overlap each other when the protective film is viewed in the thickness direction thereof.

4. The RFID tag according to claim 2, wherein the protective film includes a marked portion where a groove is formed by laser marking, and
    the print layer and the marked portion are formed in respective areas that do not overlap each other when the protective film is viewed in the thickness direction thereof.

5. A method of manufacturing a RFID tag, the method comprising the steps of:
    preparing:
    (a) an inlay having a base, a communication antenna arranged on the base, and a circuit chip connected to the antenna to perform wireless communication via the antenna,
    (b) a first sealing member disposed on a first face of the inlay,
    (c) a second sealing member disposed on a second face of the inlay, the second sealing member having a first surface which is opposite to a surface where the inlay is disposed and on which a print layer is formed by printing in only a central area of the first surface, the central area being surrounded by a marginal area of the first surface extending along the outer edge of the first surface, and
    (d) a protective member that covers the print layer and has an area spreading beyond the print layer;
    stacking the first sealing member, the inlay, the second sealing member, and the protective member in this order; and
    heating and pressurizing the entire stack of the first sealing member, the inlay, the second sealing member, and the protective member, so that the inlay is enclosed by the first sealing member and the second sealing member and there is formed a protective film having a covering portion that covers the print layer and an adhering portion that lies off the print layer while surrounding the outer edge of the print layer and adheres to the first surface.

6. The method according to claim 5, wherein the first sealing member, the second sealing member, and the protective member are made of the same material.

* * * * *